United States Patent [19]
Takeda et al.

[11] Patent Number: 5,707,481
[45] Date of Patent: Jan. 13, 1998

[54] MACHINE FOR PRODUCING PLASTIC LAMINATES

[75] Inventors: Hideyuki Takeda, Nishimine-machi; Takaaki Endo, Kanagawa, both of Japan

[73] Assignee: Fujipla Inc., Tokyo, Japan

[21] Appl. No.: 613,119

[22] Filed: Mar. 8, 1996

[51] Int. Cl.$^6$ ............................................. B32B 31/20
[52] U.S. Cl. .................. 156/555; 156/322; 156/499; 156/583.1; 219/469
[58] Field of Search .................. 156/555, 499, 156/543, 583.1, 322, 324; 219/469

[56] References Cited

U.S. PATENT DOCUMENTS

| Re. 34,917 | 4/1995 | Parkhill et al. | |
| 3,449,193 | 6/1969 | Bratton | 156/499 |
| 3,823,047 | 7/1974 | Colombo | 156/499 |
| 4,310,365 | 1/1982 | Elliott | 156/555 |
| 4,416,719 | 11/1983 | Horiuchi | 156/555 |
| 4,680,077 | 7/1987 | Hodgson | 156/499 |
| 5,139,600 | 8/1992 | Singer | 156/555 |
| 5,369,246 | 11/1994 | Nanos | |
| 5,445,700 | 8/1995 | Uang | 156/555 |

FOREIGN PATENT DOCUMENTS

| 555064 | 9/1986 | Australia. |
| 2500786 | 2/1982 | France. |

*Primary Examiner*—Daniel Stemmer
*Attorney, Agent, or Firm*—Dickinson, Wright, Moon, Van Dusen & Freeman

[57] ABSTRACT

A machine for producing plastic laminates having a feed roller means consisting of a pair of feed rollers for feeding a material to be laminated, a facing type preheater means which allows the material to be laminated which is being fed, to be preheated, while it slides along the preheater means, and a heating and pressing roller means which has both the heating function and the pressing function in one body, for heating and pressing the material to be laminated which has been preheated, resultantly being simple in the structure, small in the external dimension, less expensive in the production cost and capable of producing plastic laminates without discontinuous adhesion to have a beautiful laminated surface appearance.

3 Claims, 5 Drawing Sheets

MACHINE FOR PRODUCING PLASTIC LAMINATES

FIELD OF THE INVENTION

This invention relates to an improvement applicable to a machine for producing plastic laminates. More specifically, this invention relates to an improvement developed for simplifying the structure of and for decreasing the external dimension of the machine for producing plastic laminates and for improving the quality of the finished surface of the plastic laminates produced employing the machine for producing plastic laminates.

BACKGROUND OF THE INVENTION

A card made of a paper sheet on which literal information, such as characters, symbols or the like, is printed and/or pictorial information, such as photographs, seals or the like, is pasted and of which the top surface or the both surfaces is or are covered by transparent plastic sheet or sheets, is widely employed as an ID card, a page of a passport book or the like. A method for producing this type of a plastic laminate is to place a transparent plastic sheet whose back surface is coated with an adhesive on a paper sheet or the like on which literal information is printed and/or pictorial information is pasted, or to put a paper sheet or the like on which literal information is printed and/or pictorial information is pasted between transparent sheets, the inside surface of each of which is coated with an adhesive, to melt the adhesive by heating the assemblage of the transparent plastic sheet or sheets and the paper sheet or the like, and to stick the transparent plastic sheet or sheets to the paper sheet or the like by pressing the assemblage of the transparent plastic sheet or sheets and the paper sheet or the like. A machine for producing plastic laminates is employed for conducting the foregoing method for producing a plastic laminate.

FIG. 1 is a side view of a machine for producing plastic laminates available in the prior art. Referring to FIG. 1, the machine for producing plastic laminates available in the prior art consists of a pair of preheating rollers 7 each of which is heated by a fourth heater 72 through a second heat transmitter 71, a pair of heating rollers 8 each of which is heated by a fifth heater 82 through a third heat transmitter 81, and a pair of pressing rollers 9. In other words, the preheating function, the heating function and the pressing function are individually realised by means for preheating, heating and pressing, and a roller type preheating means is employed.

When producing a plastic laminate, an assemblage of the transparent plastic sheet or sheets and the paper sheet or the like (hereinafter referred to as a material to be laminated) 6 is preheated by the pair of preheating rollers 7, while it is rolled by the pair of preheating rollers 7. Then, the material to be laminated 6 which has been preheated is heated by the pair of heating rollers 8. During this heating process, the adhesive coated on the back surface of the transparent plastic sheet or on the both surfaces of the transparent plastic sheets is melted. Then, the heated material to be laminated 6 of which the adhesive has been melted is pressed by the pair of pressing rollers 9. During this pressing process, the transparent plastic sheet or sheets is or are stuck on the paper sheet or the like or to the paper sheets or the like. Finally, the finished plastic laminate is cooled by a cooling means which is not shown in FIG. 1.

Since the machine for producing plastic laminates available in the prior art has a pair of heating rollers and a pair of pressing rollers individually, it is involved with a drawback in which the structure is complicated, the external dimension is large and the production cost is considerably expensive.

On the other hand, when the preheating rollers 7 preheat the material to be laminated 6, the surface of the preheating rollers 7 is cooled by the material to be laminated 6 whose temperature equals to the room temperature. Therefore, the preheating process causes discontinuous temperature distribution on the surface of the preheating rollers 7. If the length of the material to be laminated 6 is less than the circumference of the preheating roller 7, and/or if the preheating processes are conducted, leaving intervals therebetween, the foregoing discontinuous temperature distribution does not cause any particular problem. However, if the length of the material to be laminated 6 is greater than the circumference of the preheating roller 7, and/or if the preheating actions are conducted continuously, the foregoing discontinuous temperature distribution along the circumference of the preheating roller 7 causes discontinuous preheating effects along the circumference of the preheating roller 7, because the cooled surfaces overlap each other. As a result, the discontinuous preheating effect causes discontinuous adhesion of the transparent plastic sheet or sheets and the paper sheet or the like and an ugly surface appearance of the finished plastic laminate. This is the other one of the drawbacks which the machine for producing plastic laminates available in the prior art can not avoid.

SUMMARY OF THE INVENTION

Accordingly, the object of this invention is to provide a machine for producing plastic laminates which is simple in the structure, small in the external dimension, less expensive in the production cost and capable of producing plastic laminates of which the surface is uniformly adhered and which has a beautiful surface appearance.

To achieve the foregoing objects, a machine for producing plastic laminates in accordance with this invention has a heating and pressing roller means (3) which has both the heating function and the pressing function in one element. As a result, the machine for producing plastic laminates in accordance with this invention is simple in the structure, small in the external dimension and less expensive in the production cost.

Further, the machine for producing plastic laminates in accordance with this invention has facing type preheater means (2) or facing type preheater part (41) rather than a roller type preheater. As a result, the machine for producing plastic laminates in accordance with this invention is free from discontinuous temperature distribution along the surface of the preheater, resulting in capability of realizing uniform adhesion and of producing plastic laminates having a beautiful surface appearance.

More specifically, a machine for producing plastic laminates in accordance with a first embodiment of this invention includes a feed roller means (1) for feeding a material to be laminated (6), the upper one or the lower one or both of facing type preheater means (2) for preheating the material to be laminated (6), while the material to be laminated (6) slides along the surface of the facing type preheater means (2), which is arranged to face the surface of the material to be laminated (6), and a heating and pressing roller means (3) for heating and pressing in one action the material to be laminated (6) which has been preheated by the facing type preheater means (2).

Since the machine for producing plastic laminates in accordance with a first embodiment of this invention has the facing type preheater means (2) which allows the material to be laminated to be preheated, while the material to be laminated (6) slides along the the facing type preheater means (2), it is free from discontinuous temperature distribution, resultantly allowing it to produce a beautiful laminated surface appearance. Further, since both the heating function and the pressing function are realised in one element, the machine for producing plastic laminates in accordance with a first embodiment of this invention is simple in the structure, small in the external dimension and less expensive in the production cost.

A machine for producing plastic laminates in accordance with a second embodiment of this invention includes a feed roller means (1) for feeding a material to be laminated (6), and the upper one or the lower one or both of facing type preheater and heat transmitter means (4) consisting of a facing type preheater part (41) which is arranged to face the surface of the material to be laminated (6) which is being fed by the feed roller means (1), for preheating the material to be laminated (6) and a heat transmitter part (42) which is connected to the facing type preheater part (41) and is arranged to surround a heating and pressing roller (31) which is a component of a heating and pressing roller means (3) which heats and presses the material to be laminated (6) which has been preheated.

Since the preheater means and the heating and pressing means are combined in one body, the machine for producing plastic laminates in accordance with a second embodiment of this invention is simple in the structure, small in the external dimension and less expensive in the production cost. The facing type preheater and heat transmitted means (4) can be readily produced by an aluminum molding process. Therefore, the rather complicated structure of the facing type preheater and heat transmitter means (4) does not cause any technical and/or economic problems.

In either the first embodiment or the second embodiment, it is realistic to add a cooling means (5) for cooling the material to be laminated (6) which has been heated and pressed.

In the second embodiment, a third heater means (43) which heats the facing type preheater and heat transmitter means (4) can be arranged in a recess produced in the facing type preheater and heat transmitter means (4) at a position to face the cylindrical surface of the heating and pressing roller (31) to improve the heating efficiency.

A machine for producing plastic laminates in accordance with a third embodiment of this invention has a facing type preheater and heat transmitter means (4) of which the end surface is covered by a cover plate (44).

A machine for producing plastic laminates in accordance with a fourth embodiment of this invention has a heating and pressing rollers (31) which are elastically supported, to allow the heating and pressing rollers (31) to part from each other or to come close to each other.

A machine for producing plastic laminates in accordance with a fifth embodiment of this invention has a heating and pressing rollers (31) which are allowed to move together with the facing type preheater and heat transmitter means (4).

A machine for producing plastic laminates in accordance with a sixth embodiment of this invention has one or two heating and pressing rollers (31) each of which is covered by an elastic tube (36).

BRIEF DESCRIPTION OF THE DRAWINGS

This invention, together with its various features and advantages, can be readily understood from the following more detailed description presented in conjunction with the following drawings, in which.

DETAILED DESCRIPTION OF THE PREFERRED EMBODIMENTS

Referring to drawings, a detailed description will be presented below for machines for producing plastic laminates in accordance with six embodiments of this invention.

First Embodiment

Figure 1:
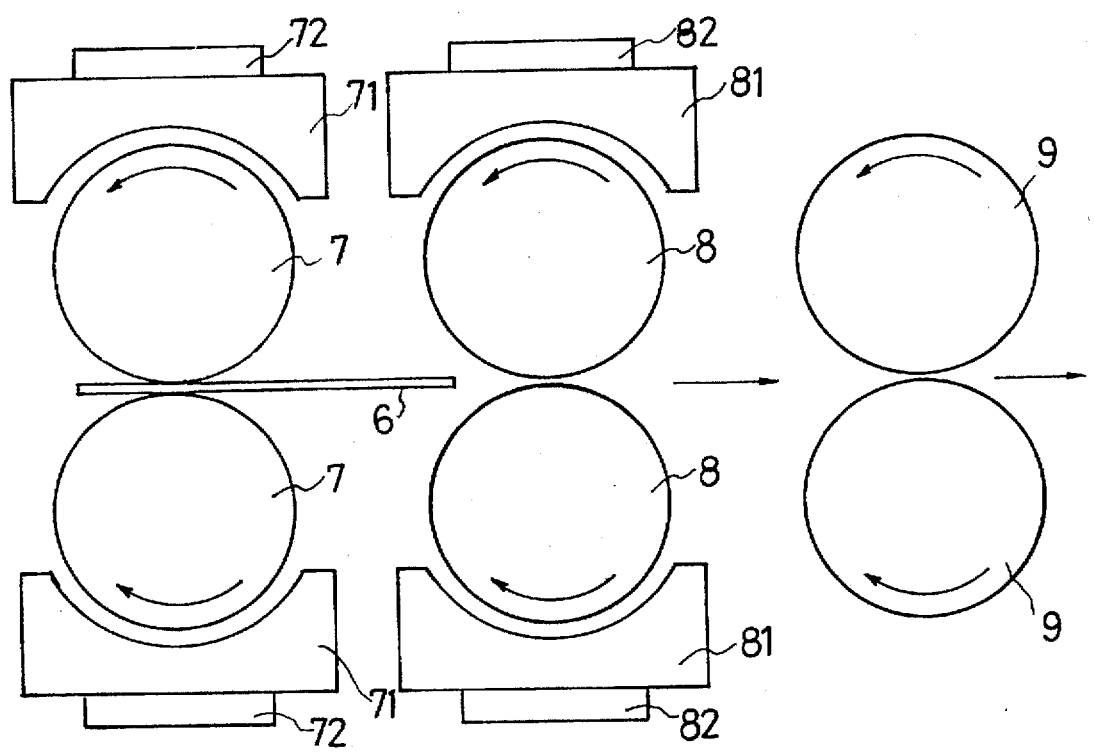
FIG. 1 is a side view of a machine for producing plastic laminates available in the prior art.
Figure 2:
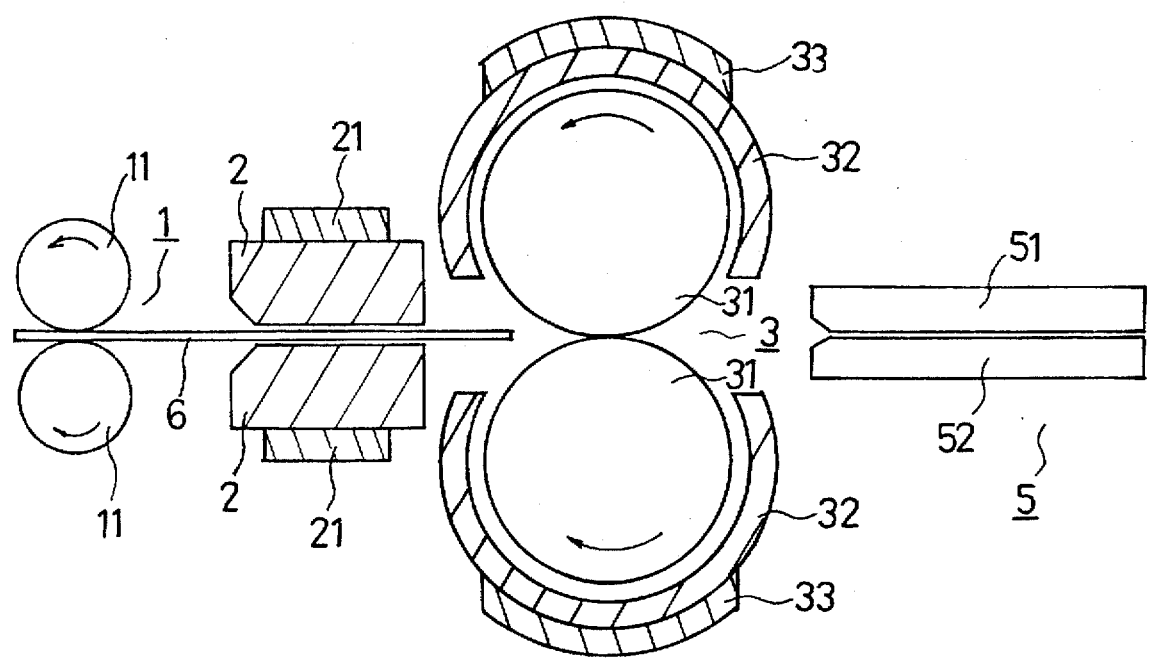
FIG. 2 is a side view of a machine for producing plastic laminates in accordance with the first embodiment of this invention.

Referring to FIG. 2, a machine for producing plastic laminates in accordance with the first embodiment of this invention includes a feed roller means 1 consisting of a pair of feed rollers 11 for feeding a material to be laminated 6, the upper one or the lower one or both of facing type preheater means 2 for preheating the material to be laminated 6, while the material to be laminated 6 slides along the surface of the facing type preheater means 2, which is arranged to face the surface of the material to be laminated 6 and which is heated by a first heater means 21, and a heating and pressing roller means 3 consisting of a pair of heating and pressing rollers 31 for heating and pressing the material to be laminated 6 which has been preheated by the facing type preheater means 2, the heating and pressing roller 31 being heated by a second heater means 33 through a first heat transmitter means 32.

When a plastic laminate is produced, a material to be laminated 6 is fed by the feed roller means 1 toward the facing type preheater means 2. The facing type preheater means 2 is actually a heating block along which the material to be laminated 6 slides and which is heated by the first heater means 21, and it preheats the material to be laminated 6 which is being fed by the feed roller means 1.

In this embodiment, two sets of the facing type preheater means 2, the upper one and the lower one, are employed to heat both the top surface and the bottom surface of the material to be laminated 6 which slides in a gap between the upper and lower facing type preheater means 2. Although the facing type preheater means 2 is cooled by the material to be laminated 6, there is no possibility in which a discontinuous temperature distribution occurs. Although a temperature incline occurs along the surface of the facing type preheater means 2 along which the material to be laminated 6 passes, this temperature incline does not cause any problem for the quality of the surface of the finished plastic laminate.

After being preheated, the material to be laminated 6 is heated and pressed in one action by the heating and pressing roller means 3 consisting of a pair of heating and pressing rollers 31. The heating and pressing rollers 31 are elastically supported by springs (not shown) to be allowed to part from each other or to come close to each other. Since the heating and pressing roller means 3 has both the heating function and the pressing function in one body, it is effective to decrease the external dimension of the machine for producing plastic laminates.

A cooling means 5 consists of an upper cooling plate 51, a lower cooling plate 42 and a mechanism for pulling them to each other. After being heated and pressed, the material to be laminated 6 is cooled by the cooling means 5.

Since the preheater means employed for this embodiment is not a roller type but a facing type, it does not cause a discontinuous temperature distribution along the heating surface. As a result, the machine for producing plastic laminates in accordance with this embodiment is allowed to produce a plastic laminate which has been uniformly adhered and has a beautiful surface appearance. Since the machine for producing plastic laminates in accordance with this embodiment has a heating and pressing roller means having both the heating function and the pressing function, the external dimension thereof is decreased.

Second Embodiment

Figure 3:
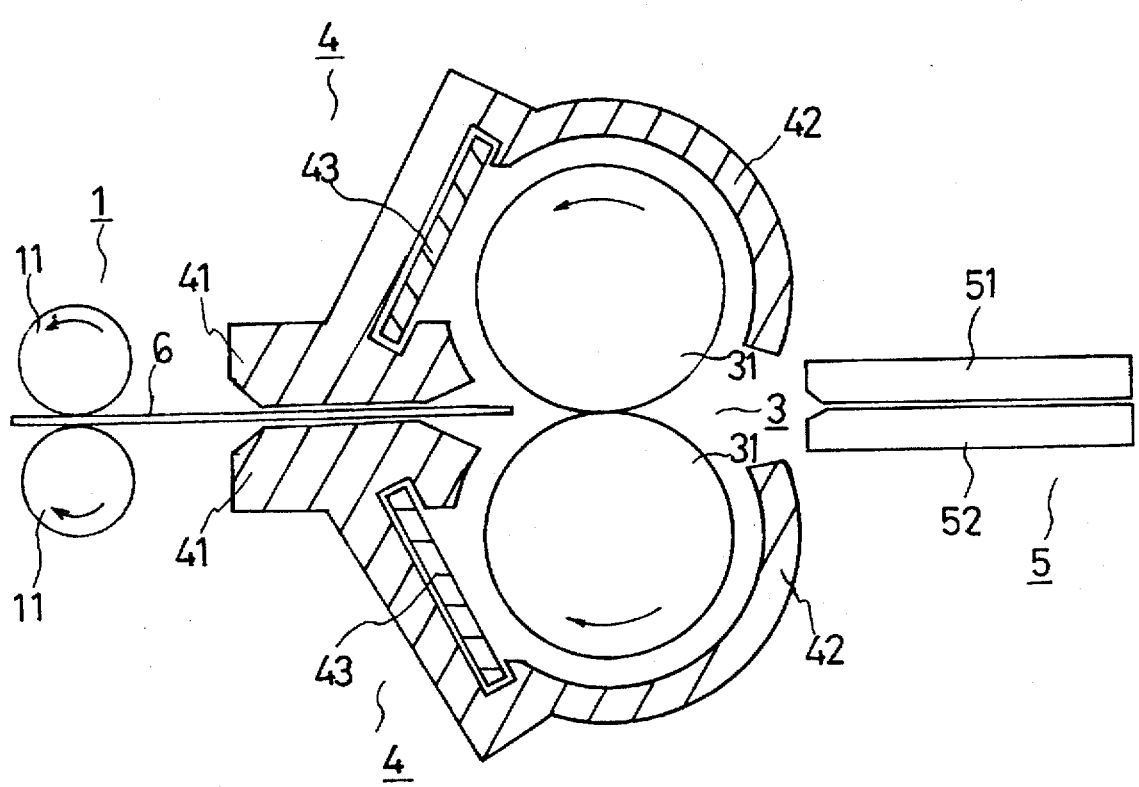
FIG. 3 is a side view of a machine for producing plastic laminates in accordance with the second embodiment of this invention.

Referring to FIG. 3, a machine for producing plastic laminates in accordance with the second embodiment of this invention includes a feed roller means 1 consisting of a pair of feed rollers 11 for feeding a material to be laminated 6, and the upper one or the lower one or both of facing type preheater and heat transmitter means 4 consisting of a facing type preheater part 41 which is arranged to face the surface of the material to be laminated 6 which is being fed by the feed roller means 1, for preheating the material to be laminated 6 which is being fed by the feed roller means 1 and a heat transmitter part 42 which is connected to the facing type preheater part 41 and is arranged to surround a heating and pressing roller 31 which is a component of a heating and pressing roller means 3 which heats and presses the material to be laminated 6 which has been preheated, the facing type preheater and heat transmitter means 4 being heated by a third heater means 43.

When a plastic laminate is produced, a material to be laminated 6 is fed by the feed roller means 1 to the facing type preheater and heat transmitter means 4. The facing type preheater and heat transmitter means 4 consists of a facing type preheater part 41 and a heat transmitter part 42. The facing type preheater part 41 and the heat transmitter part 42 are heated by the third heater means 43. The facing type preheater part 41 is actually a heating block along which the material to be laminated 6 slides. Since the preheater part 41 is not a roller type but a facing type, it does not cause discontinuous temperature distribution along the heating surface of the preheater part 41, resultantly allowing the machine for producing plastic laminates in accordance with the second embodiment to produce a plastic laminate which is uniformly adhered and has a beautiful finished surface appearance. The heat transmitter part 42 is a half cylinder arranged to partly surround a heating and pressing roller 31, which is a component of a heating and pressing roller means 3, which heats and presses the material to be laminated 6 which has been preheated by the facing type preheater part 41.

Since the facing type preheater and heat transmitter means 4 is compact, it is effective to decrease the external dimension of the machine for producing plastic laminates in accordance with the second embodiment of this invention.

In the drawing, the third heater means 43 is arranged in a recess produced in the heat transmitter part 42 to face the cylindrical surface of the heating and pressing roller 31. This arrangement is effective to heat the cylindrical surface of the heating and pressing roller 31 more efficiently. Further, in the drawing, the third heater means 43 is arranged in the neighborhood of the facing type preheater part 41. This is effective to heat the facing type preheater part 41 efficiently.

Although the facing type preheater and heat transmitter means 4 has a rather complicated structure, it can be readily produced by using an aluminum molding process. Therefore, the shape of the facing type preheater and heat transmitter means 4 does not cause any technical and/or economical problems.

A cooling means 5 consists of an upper cooling plate 51 and a lower cooling plate 52 and a mechanism for pulling them to each other. After being heated and pressed, the material to be laminated 6 is cooled by the cooling means 5.

Third Embodiment

Figure 4:
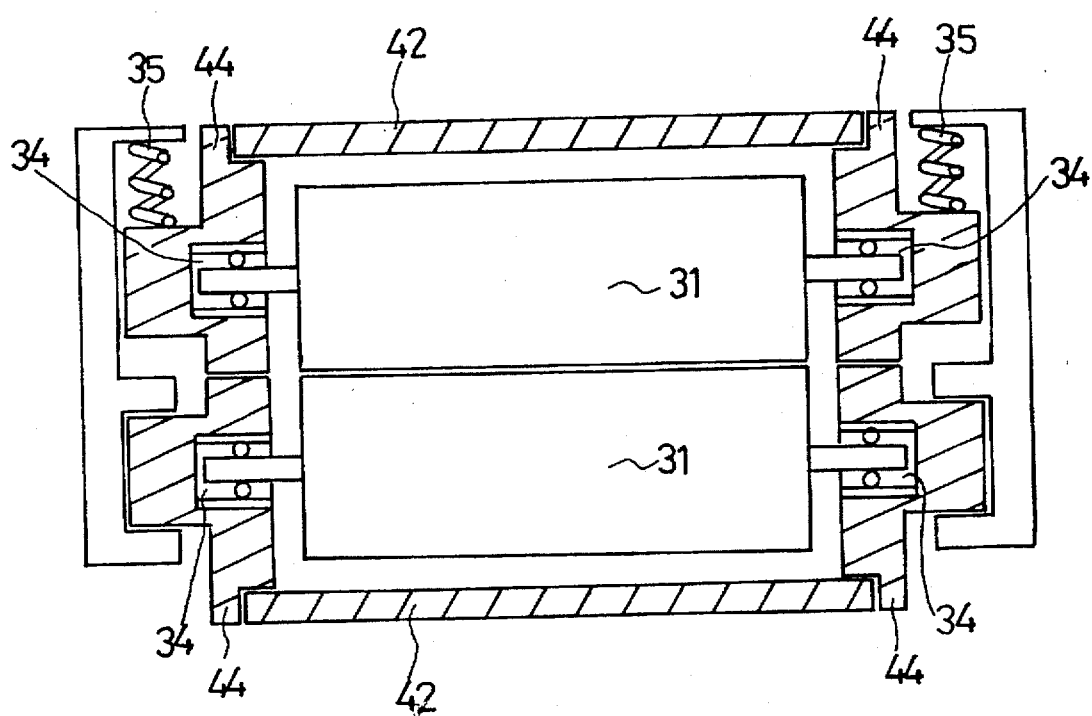
FIG. 4 is a cross-sectional view of a machine for producing plastic laminates in accordance with the second embodiment of this invention.

Referring to FIG. 4, the end surface of the heat transmitter part 42 is covered by cover plates 44. The cover plates 44 are effective to keep the internal space of the heat transmitter part 42 warm, resultantly improving the efficiency for using heat.

Fourth Embodiment

Referring to FIG. 4, the bearings 34 of the shaft which supports one of the heating and pressing rollers 31 are elastically supported by springs 35, resultantly allowing one of the heating and pressing rollers 31 to part from or to come close to the other of the heating and pressing rollers 31. This causes the heating and pressing rollers 31 to press the material to be laminated 6 therebetween.

Fifth Embodiment

Referring to FIG. 4, the heat transmitter part 42 is fixed to the cover plate 44 and bearings 34 to engage the shaft which supports the heating and pressing roller 31, resultantly allowing the preheater part 41 and heat transmitter part 42 to move together with the heating and pressing roller 31. This allows the gap between the heat transmitter part 42 and the heating and pressing roller 31 to be made small while still allowing the machine to accept objects of varying thickness. As a result, the heat transmission efficiency is remarkably improved.

Sixth Embodiment

Figure 5:
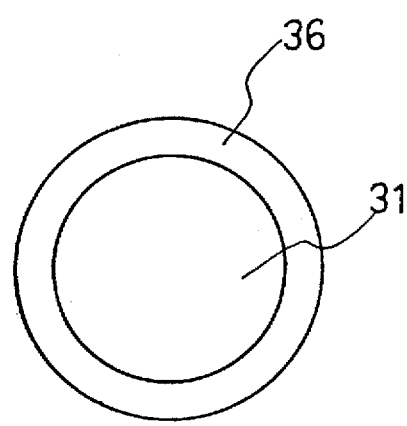
FIG. 5 is a cross-sectional view of a heating and pressing roller employable for a machine for producing plastic laminates in accordance with this invention.

Referring to FIG. 5, one or both of the heating and pressing rollers 31 can be covered by an elastic tube 36. This is effective to increase the area in which the elastic tube 36 contacts the material to be laminated 6, resultantly increasing the heating efficiency.

In this case, the bearings 34 of the shaft which supports one of the heating and pressing rollers 31 are not necessary to be elastically supported by springs 35.

The above description has clarified that a machine for producing plastic laminates which is simple in the structure, small in the external dimension, less expensive in the production cost, and capable of producing a plastic laminate which is uniformly adhered and has a beautiful laminated surface appearance, has been successfully provided.

Although this invention has been described with reference to specific embodiments, this does not mean to be construed in a limiting sense. Various other embodiments and/or modifications of this invention will become apparent to persons skilled in the art upon reference to the description of this invention. It is therefore contemplated that claims will cover any such embodiments and/or modifications as fall within the true scope of this invention.

What is claimed is:

1. A machine for producing plastic laminates comprising
   feed roller means (1) comprising a pair of feed rollers (11) for feeding a material to be laminated (6),
   a facing preheater part (41) arranged to face said material to be laminated (6), which is being fed by said feed roller means (1), for preheating said material to be laminated (6),
   two heating and pressing rollers for receiving said material from said feed roller means and for heating and pressing said material to be laminated,
   a heat transmitter part (42) connected to said facing preheater part (41) and surrounding at least one of said heating and pressing rollers,
   heater means (43) arranged in a recess in said facing preheater and heat transmitter part to face a cylindrical surface of said heating and pressing roller (31) for heating said facing preheater and heat transmitter means,
   cover plates engaging and covering opposed ends of said facing preheater and heat transmitter part and having bearings for engaging shaft means supporting said at least one of said heating and pressing rollers, and
   means for elastically supporting said cover plates to allow said heating and pressing rollers (31) to part from each other or to come close to each other while maintaining a fixed relationship among said at least one of said heating and pressing rollers, said facing preheater, and said heat transmitter part.

2. Apparatus for producing discontinuous plastic laminates comprising:
   feed roller means (1) comprising upper and lower feed rollers (11) for receiving discontinuous pieces of material (6) to be laminated,
   pre-heater and heat transmitting means (4) comprising an upper part and a lower part, wherein
   said upper part comprises an upper face of an elongate heating block (41) for transmitting energy to a top of said discontinuous pieces of material to preheat said discontinuous pieces of material, an upper heat transmitting part (42) integral with said upper face of said heating block for transmitting energy to an upper heating and pressing roller (31) for heating and applying pressing forces to the top of said discontinuous pieces of material, and a recess in said upper heat transmitting part having an upper heating means (43) therein for heating said upper face of said heating block and heating said upper heat transmitting part, and
   said lower part comprises a lower face of an elongate heating block (41) for transmitting energy to a bottom of said discontinuous pieces of material (6) to pre-heat said discontinuous pieces of material, a heat transmitting part (42) integral with said lower face of said heating block for transmitting energy to a lower heating and pressing roller for heating and applying pressing forces to the bottom of said discontinuous pieces of material, and a recess in said lower heat transmitting part having a lower heating means (43) therein for heating said lower face of said heating block and heating said lower heat transmitting part,
   said upper heating and pressing roller (31),
   upper cover plates (44) attached to opposed ends of said upper heat transmitting part (42) for covering the ends of said upper heat transmitting part and having bearings engaging a shaft supporting said upper heating and pressing roller (31),
   said lower heating and pressing roller (31),
   lower cover plates (44) attached to opposed ends of said lower heat transmitting part for covering the ends of said lower heat transmitting part (42) and having bearings engaging a shaft supporting said lower heating and pressing roller, and
   means for mounting said upper cover plates, said upper heating and pressing roller, and said upper part for vertical movement with respect to said lower cover plates, said lower heating and pressing roller, and said lower part to accommodate said discontinuous pieces of material having different thickness, wherein said means for mounting comprises resilient means (35) for elastically supporting said upper cover plates to allow said upper heating and pressing roller to elastically come close to or part from said lower heating and pressing roller.

3. Apparatus according to claim 2 further comprising cooling means (5) for receiving discontinuous laminates from said integral preheater and heat transmitting means and cooling said discontinuous laminates.

* * * * *